United States Patent [19]
Hiraya et al.

[11] Patent Number: 6,138,639
[45] Date of Patent: Oct. 31, 2000

[54] IN-CYLINDER DIRECT-INJECTION SPARK-IGNITION ENGINE

[75] Inventors: Koji Hiraya; Masayuki Zaima, both of Kanagawa, Japan

[73] Assignee: Nissan Motor Co., Ltd., Yokohama, Japan

[21] Appl. No.: 09/226,609

[22] Filed: Jan. 7, 1999

[30] Foreign Application Priority Data

Jan. 7, 1998 [JP] Japan .................................. 10-001643

[51] Int. Cl.⁷ .............................. F02B 1/08; F02B 17/00
[52] U.S. Cl. ...................... 123/295; 123/301; 123/302; 123/305
[58] Field of Search .................... 123/276, 295, 123/298, 301, 302, 305, 308

[56] References Cited

U.S. PATENT DOCUMENTS

| | | | |
|---|---|---|---|
| 3,452,726 | 7/1969 | Szymanski | 123/260 |
| 4,811,708 | 3/1989 | Gruden | 123/299 |
| 5,740,777 | 4/1998 | Yamamoto et al. | 123/305 |
| 5,806,482 | 9/1998 | Igarashi et al. | 123/276 X |
| 5,816,215 | 10/1998 | Yoshikawa et al. | 123/301 |
| 5,960,767 | 10/1999 | Akimoto et al. | 123/301 X |

FOREIGN PATENT DOCUMENTS

| | | |
|---|---|---|
| 0 277 296 | 8/1988 | European Pat. Off. . |
| 0 778 402 | 6/1997 | European Pat. Off. . |
| 6-81651 | 3/1994 | Japan . |
| 8-35429 | 2/1996 | Japan . |
| 96/36808 | 11/1996 | WIPO . |

OTHER PUBLICATIONS

Patent Abstracts of Japan, vol. 018, No. 491 (M–1672), Sep. 13, 1994, abstract of JP 06 159079 (Fuji Heavy Ind. Ltd.), Jun. 7, 1994.

Primary Examiner—Tony M. Argenbright
Attorney, Agent, or Firm—Foley & Lardner

[57] ABSTRACT

A direct-injection spark-ignition engine operable between a stratified charge combustion mode where fuel injection is executed on a compression stroke while introducing a vertical-vortex tumble flow to an induced air drawn into a combustion chamber through an intake port, and a homogeneous combustion mode where fuel-injection early in the intake stroke produces a homogeneous air-fuel mixture, comprises a cylinder block having a cylinder, a piston movable through a stroke in the cylinder and having a centrally-formed piston bowl cavity combustion chamber in its piston head, a cylinder head mounted on the cylinder block, a centrally-located spark plug, and a fuel injector valve provided nearby the intake valve for injecting fuel directly into the combustion chamber. The piston bowl cavity combustion chamber is formed, so that the deepest portion of the piston bowl cavity combustion chamber is obtained at the center of the piston head, and the inner peripheral concave wall surface of the cavity combustion chamber is contoured to be curved in a direction of a streamline of the vertical-vortex tumble flow.

11 Claims, 7 Drawing Sheets

IN-CYLINDER DIRECT-INJECTION SPARK-IGNITION ENGINE

The contents of Application No. TOKUGANHEI 10-1643, filed Jan. 7, 1998, in Japan is hereby incorporated by reference.

BACKGROUND OF THE INVENTION

1. Field of the Invention

The present invention relates to an in-cylinder direct-injection spark-ignition internal combustion engine equipped with an open combustion chamber type piston in which fuel is injected directly into engine cylinders and it is ignited by an electric spark, and specifically to techniques for effectively sustaining strong tumble flow for stable combustion (stable stratified charge combustion and stable homogeneous combustion), and capable of enhancing the engine durability (e.g., a piston life).

2. Description of the Prior Art

Recently, there have been proposed and developed various in-cylinder direct-injection spark-ignition engines in which fuel is injected directly into the engine cylinders. Generally, on such direct-injection spark-ignition engines, a combustion mode is changeable between a homogeneous combustion mode (an early injection combustion mode) where fuel-injection early in the intake stroke produces a homogeneous air-fuel mixture, and a stratified charge combustion mode (a late injection combustion mode) where late fuel-injection delays the event until near the end of the compression stroke to produce a stratified air-fuel mixture. As is generally known, switching between these two combustion modes is determined depending on the engine operating condition, such as engine speed and load. Such stratified charging or stratified combustion mode is effective under a low engine-load operating condition where the amount of fuel injected is comparatively less. In contrast to the above, during high engine-load operation where the amount of fuel sprayed out is comparatively great due to demands for more engine power or more engine output torque, there is less requirement for stratified charging, and in lieu this it is necessary to form more uniform air-fuel mixture layers, particularly in order to avoid the engine from knocking. One such in-cylinder direct-injection spark-ignition engine has been disclosed in Japanese Patent Provisional Publication No. 8-35429 or in Japanese Patent Provisional Publication No. 6-81651. The Japanese Patent Provisional Publication No. 8-35429 teaches the use of a swirl control valve which creates swirl flow by modulating in-cylinder gas motion and modulates air/fuel mixture location. On the other hand, the Japanese Patent Provisional Publication No. 6-81651 teaches the use of upright straight intake ports which serve to efficiently direct intake air induced into the combustion chamber in a direction of a curved-top piston head, and to redirect the intake-air flow into a strong reverse tumble flow for stable combustion. In in-cylinder direct-injection spark-ignition engines disclosed in the Japanese Patent Provisional Publication Nos. 8-35429 and 6-81651, a deep piston-bowl-cavity combustion chamber is formed in a piston crown (or a piston head). Fuel-injection is made on the compression stroke, keeping the previously-noted in-cylinder swirl flow or the reverse tumble flow, and then the swirl flow (or the tumble flow) carries the air-fuel mixture to the vicinity of the spark plug. As a result, the rich mixture (a readily ignitable mixture) is concentrated around the plug and the concentration of the rich mixture is first ignited during the combustion stroke. Second, the surrounding air layers (lean or ultra-lean mixture layers of an air/fuel ratio close to a lean misfire limit) that contain little fuel, are ignited. To insure good stratified combustion (or to efficiently concentrate the readily ignitable mixture to the vicinity of the plug), it is not preferable to widely spread the fuel spray, injected from the fuel injector nozzle on the compression stroke, within the combustion chamber, for a particular period of time during which the fuel spray injected is carried to the vicinity of the plug. For the reasons set forth above, in conventional direct-injection spark-ignition engines, the piston-bowl-cavity combustion chamber is formed in the piston crown such that the center axis of the piston bowl cavity is largely offset from the central axis of the piston towards the intake valve, and such that the piston bowl cavity is formed as a relatively deep and large cavity. Additionally, in the prior art engines disclosed in the Japanese Patent Provisional Publication Nos. 8-35429 and 6-81651, a spray angle of fuel injected by the injector valve is narrow or less. Owing to such a less fuel-spray angle, the momentum of the sprayed fuel tends to be concentrated spatially, thus producing an undesiredly increased spray penetration (spray travel). Due to the excessively increased spray penetration, the fuel, which collides with or impinges on the piston head (i.e., the piston-bowl-cavity combustion chamber wall or the wall of the bowl-in-piston combustion chamber) and is reflected therefrom, may impinge secondarily on the cylinder wall during the homogeneous combustion mode in the intake stroke. Owing to such impingement of the narrow-angle fuel spray on the piston bowl cavity, there is an increased tendency for the incoming fuel to adhere to the piston-bowl-cavity combustion chamber wall in the form of a fuel film, and as a result rapid carbonization could occur, thus deteriorating exhaust-emission control performance by the increased amount of exhaust emissions such as smoke and particulate matter and by formation of unburned hydrocarbons (HC). There is a possibility that the increased spray penetration results in undesired deposits in the engine. The deep and large piston bowl cavity results in the increase in the overall surface area of the combustion chamber, and thus increases a thermal loss. Additionally, the off-center piston bowl cavity deteriorates a piston balance of the open combustion type piston. Particularly, during cold engine operation, there is a great difference between a thermal expansion efficiency of the engine cylinder and a thermal expansion efficiency of the piston, and thus the piston often experiences undesired wobbling motion. The wobbling motion of the piston, occurring during the cold engine operation, may produce noises and unsymmetrical piston wear.

SUMMARY OF THE INVENTION

Accordingly, it is an object of the invention to provide an in-cylinder direct-injection spark-ignition engine which avoids the aforementioned disadvantages of the prior art.

It is another object of the invention to provide an in-cylinder direct-injection spark-ignition engine capable of effectively enhancing the engine power output under a low engine-load condition as well as under a high engine-load condition, while realizing both a high stratified combustion stability and a high homogeneous combustion stability, and also enhancing the engine durability.

It is a further object of the invention to provide an in-cylinder direct-injection spark-ignition engine ensuring a good tumble-flow sustaining performance (or a good vertical vortex flow sustaining performance) and a good delivery of a small very rich layer of air-fuel mixture towards around the spark plug by way of a fling-up action caused by strong tumble flow during a stratified combustion mode.

It is a still further object of the invention to provide an in-cylinder direct-injection spark-ignition engine equipped with a centrally-located spark plug centrally mounted on a ceiling wall of the combustion chamber and a center piston-bowl-cavity combustion chamber formed in the central portion of the piston head, which engine is capable of reducing a thermal loss, and of avoiding undesirable noises and unsymmetrical piston wear, and of enhancing tumble-flow sustaining performance, and of ensuring a positive separation of a fuel film adhered to the piston-bowl-cavity combustion chamber wall with strong tumble flow, thus achieving clean, stable combustion.

It is another object of the invention to provide an electronically-controlled in-cylinder direct-injection spark-ignition engine equipped with an electronic fuel injection system, which engine is capable of enhancing a stratified charge combustion stability by way of proper fling-up action, obtained by full cooperation of the strong in-cylinder tumble flow and the optimally-controlled wide fuel-spray angle during a stratified combustion mode, and of enhancing a homogeneous combustion stability and reducing exhaust emissions (smoke, particulates, unburnt HC) and deposits in the engine by way of reduction in spray penetration (fuel-spray travel) and good mixture homogenization, both obtained by the full cooperation of the strong in-cylinder tumble flow and the optimally-controlled wide fuel-spray angle during a homogeneous combustion mode.

In order to accomplish the aforementioned and other objects of the present invention, a direct-injection spark-ignition engine operable in at least a stratified charge combustion mode where fuel injection is executed on a compression stroke while introducing a vertical-vortex tumble flow to an induced air drawn into a combustion chamber through an intake port, comprises a cylinder block having a cylinder, a piston movable through a stroke in the cylinder, and having a piston bowl cavity combustion chamber in a piston head, a cylinder head mounted on the cylinder block, a spark plug centrally located at a center of the combustion chamber, and a fuel injector valve provided at a side wall portion of the combustion chamber and near an intake valve disposed in the intake port for injecting fuel directly into the combustion chamber. The piston bowl cavity combustion chamber is formed in the piston head, so that the deepest portion of the piston bowl cavity combustion chamber is obtained at the center of the piston head, and the inner peripheral concave wall surface of the piston bowl cavity combustion chamber is contoured to be curved or rounded in a direction of a streamline of the vertical-vortex tumble flow. It is preferable that the piston bowl cavity combustion chamber comprises a spherical bowl-like cavity having a circular opening and the deepest portion at a cavity center thereof. More preferably, the spherical bowl-like cavity is coaxially arranged with respect to the central axis of the piston. To enhance the combustion stability, it is preferable that the ratio of an inside diameter of the circular opening of the spherical bowl-like cavity to a cylinder bore is set within a range of 40% to 80%, and the ratio of a radius-of-curvature of the inner peripheral concave wall surface of the spherical bowl-like cavity to the cylinder bore is set within a range of 20% to 65%. Alternatively, the piston bowl cavity combustion chamber may comprise a woodruff keyway-like cavity having a square opening and the deepest portion at a cavity center thereof. Preferably, the ratio of the length of each of four sides of the square opening of the woodruff keyway-like cavity to the cylinder bore is set within a range of 40% to 80%, and also the ratio of a radius-of-curvature of the rounded bottom wall portion of the woodruff keyway-like cavity to the cylinder bore is set within a range of 20% to 65%. More preferably, the direct-injection spark-ignition engine may further comprise a tumble-flow strengthening mechanism provided in an induction system. The tumble-flow strengthening mechanism may comprise a partial shut-off valve movable to a closed position to shut off a lower half of the intake port during the stratified charge combustion mode, and to an open position to ensure full fluid communication therethrough during the homogeneous combustion mode. Alternatively, the tumble-flow strengthening mechanism may comprise a collared wall portion attached to the back of a valve head portion of the intake valve so that the collared wall portion circumferentially extends over the lower half of the valve head portion. Furthermore, in order to enhance various spray characteristics, namely tip penetration (fuel-spray penetration), spray/wall impingement, air/fuel mixing, and formation of a controlled air/fuel mixture layer, it is preferable that the fuel injector valve has a wide-angle injector nozzle of a fuel-spray angle, ranging from 70° to 90°.

DESCRIPTION OF THE PREFERRED EMBODIMENTS

First Embodiment

Figure 1:
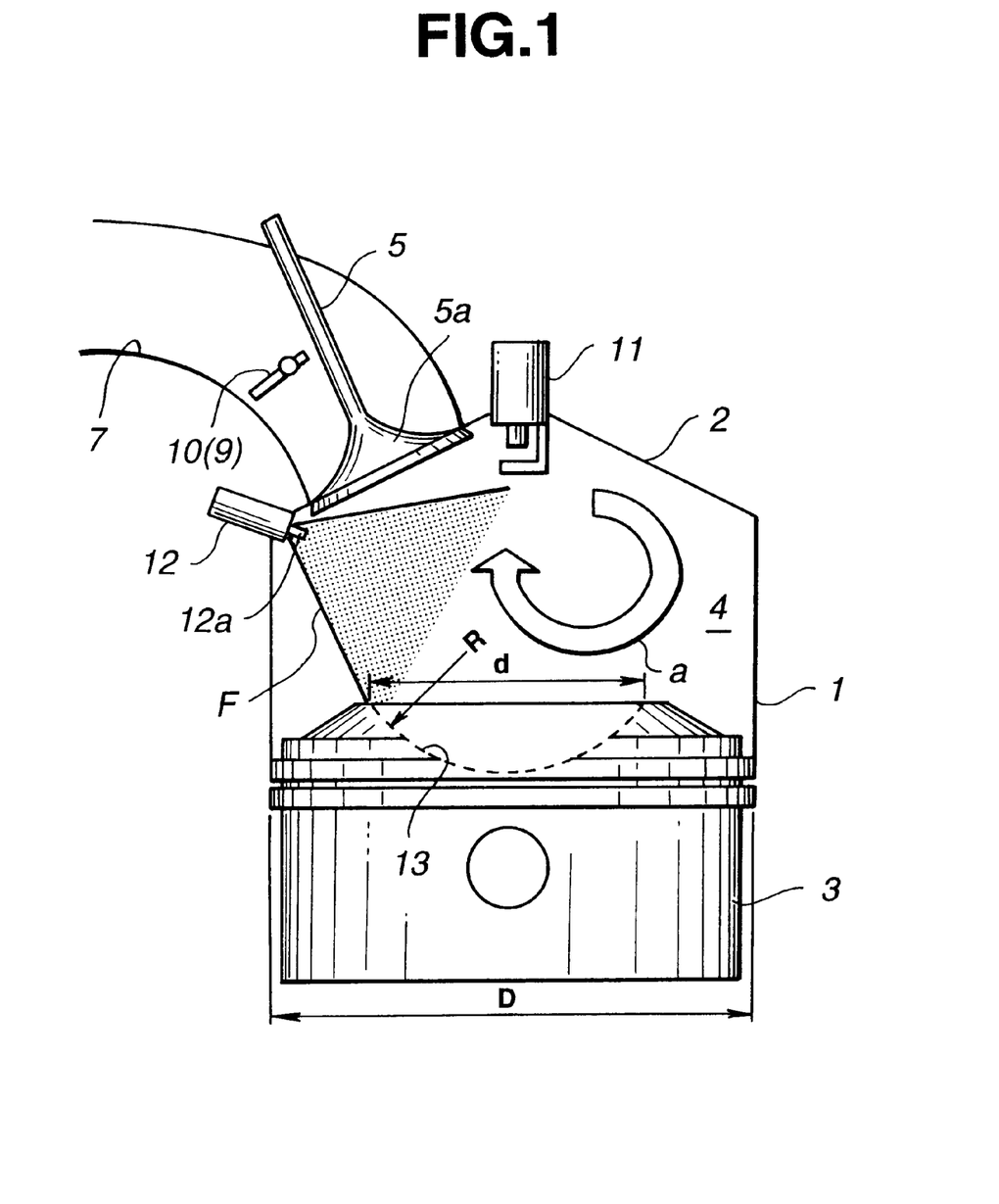
FIG. 1 is a longitudinal cross-sectional view illustrating a first embodiment of a cylinder direct-injection spark-ignition internal combustion engine having a piston formed with a spherical bowl-like piston cavity.
Figure 2:
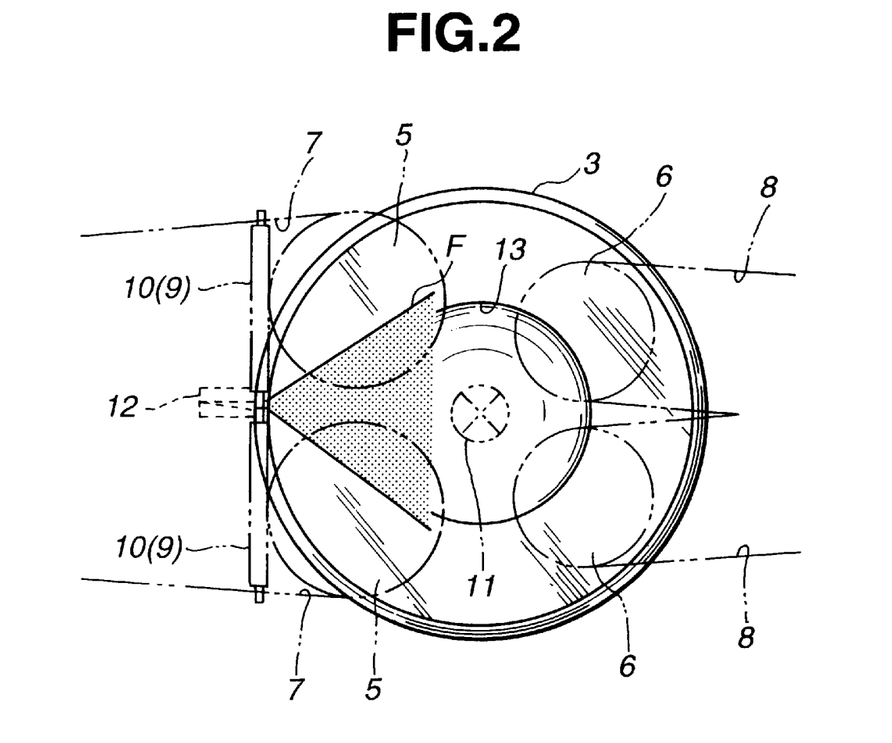
FIG. 2 is a top view of the piston of the engine of the first embodiment, having the improved spherical bowl-in-piston combustion chamber structure.
Figure 3:
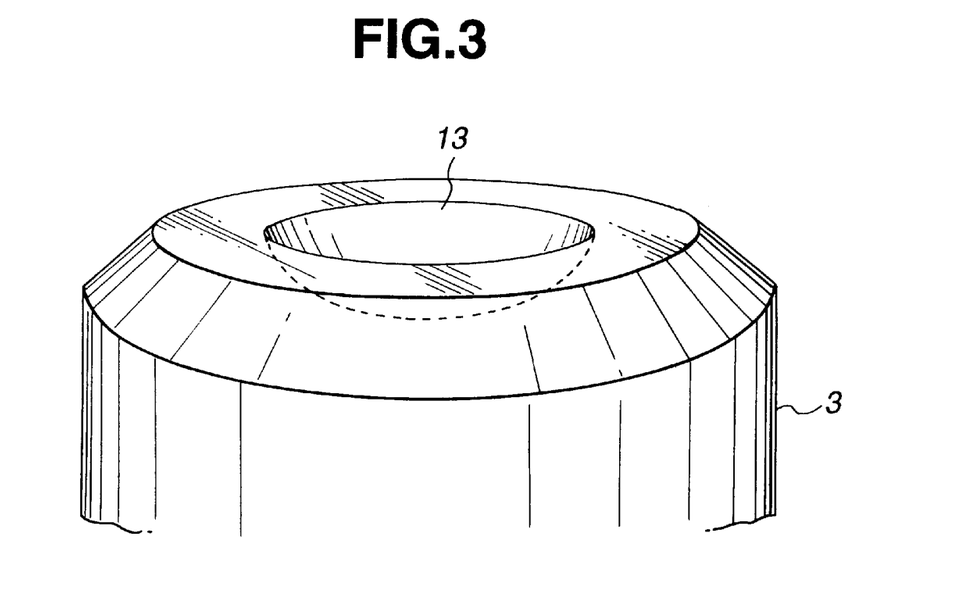
FIG. 3 is a perspective view illustrating the piston head portion of the engine of the first embodiment.

Referring now to the drawings, particularly to FIGS. 1 through 3, the in-cylinder direct-injection spark-ignition engine of the invention is exemplified in a four-valve, gasoline-fuel, spark-ignition internal combustion engine. As shown in FIG. 1, in the direct-injection spark-ignition engine of the first embodiment, the ignition plug (the spark plug) 11 is located essentially at the center of the combustion chamber 4. The cylinder head 2 is mounted on a cylinder block 1 having an engine cylinder. A piston 3 is provided in the cylinder to be movable through a stroke in the cylinder. The combustion chamber 4 is defined by the cylinder wall of the cylinder block 1, the bottom face of the cylinder head 2, and the top surface (or the piston crown or the piston head) of the piston 3. The engine is equipped with two intake ports (7, 7), offsetting from the center axial line of the cylinder bored in the cylinder block 1. As clearly seen in FIG. 2, the cylinder head 2 is equipped with two intake valve ports (7, 7), offsetting from the center axial line of the cylinder formed in a cylinder block 1, and two exhaust valve ports (8, 8), offsetting from the center axial line of the cylinder in the opposite direction to positions of the intake ports. As appreciated from FIGS. 1 and 2, the engine has a so-called cross-flow port structure. Two intake valves (5, 5) are disposed in the respective intake ports (7, 7) to open and close them, whereas two exhaust valves (6, 6) are disposed in the respective exhaust ports (8, 8) to open and close them. Each of the intake ports (7, 7) is contoured to easily affect sufficient turbulent action, that is, a strong tumble flow to the air-fuel mixture, in the form of a vertical vortex (in-cylinder tumble flow) tumbling within the combustion chamber 4, as indicated in the arrow a in FIG. 1. In the shown embodiment, a tumble-flow strengthening means or a tumble-flow strengthening mechanism 9 is also provided in each of the intake ports (7, 7) contained in the induction system, for the purpose of forcibly introducing a strong tumbling action to the air-fuel mixture particularly during a stratified charge combustion mode (a late injection combustion mode) where late fuel-injection delays the event until near the end of the compression stroke to produce a stratified air-fuel mixture, and the flame begins in a small very rich air-fuel mixture layer around the tip of the spark plug 11 and after ignition, spreads to the leaner mixture filling the rest of the combustion chamber 4. As can be appreciated from FIGS. 1 and 2 (the first embodiment) and from FIGS. 7 and 8 (a second embodiment which will be fully described later), a partial shut-off valve 10 is used as the tumble-flow strengthening mechanism 9. The partial shut-off valve 10 is moved to its closed position to shut off substantially the lower half of each of the intake ports (7, 7) during the stratified combustion mode to create a strong tumble flow in the combustion chamber. The partial shut-off valve 10 is moved to its open position to ensure full fluid communication therethrough during a homogeneous combustion mode (an early injection combustion mode) where fuel-injection early in the intake stroke produces a homogeneous air-fuel mixture, and then the mixture is uniformly mixed to an air/fuel ratio as close to stoichiometric (14.6:1 air/fuel ratio (AFR)) as possible. A fuel-injector valve 12 is provided in aside wall portion of the combustion chamber 4 and in the vicinity of the substantially middle portion of two downstream opening ends of the intake ports (7, 7), so as to inject or spray out fuel directly into the combustion chamber 4.

A spherical bowl-like piston bowl cavity combustion chamber (or a spherical cup-like piston bowl cavity combustion chamber) 13 is formed in the central portion of the piston head 3. The spherical bowl-like piston cavity 13 is formed in the piston-head central portion so that the maximum cup depth of the cavity 13 is obtained at the cavity centre, and so that the central deepest point of the cavity is aligned with respect to the center axis of the piston 3, and the spherical bowl-like cavity 13 is coaxially arranged with respect to the center axis of the piston 3. Additionally, a spherically-curved, recessed, inner peripheral concave wall surface (or a concave bottom wall surface) of the cavity 13 is so dimensioned or contoured that the recessed inner peripheral wall surface of the cavity 13 is curved or rounded in a direction of a streamline of the previously-discussed tumble flow indicated by the arrow a of FIG. 1. In the piston structure of the engine of the first embodiment, as best seen in FIG. 3, the piston bowl cavity combustion chamber 13 is formed as a spherically-recessed bowl-like cavity. For the reasons set out below by reference to FIGS. 4 and 5, the uppermost circular opening end (simply the circular opening) of the spherically-recessed bowl-like cavity combustion chamber 13 is dimensioned so that the ratio (d/D) of the inside diameter (d) of the circular opening of the bowl-like cavity combustion chamber 13 to the cylinder bore (D) is within a range of 40% to 80% (see FIG. 4), and so that the ratio (R/D) of the radius-of-curvature (R) to the cylinder bore (D) is within a range of 20% to 65%. In addition to the above, in the shown embodiment, a wide-angle injector nozzle is used as a fuel injector nozzle 12a of the injector valve 12 to ensure a wide fuel-spray angle, ranging from 70 degrees to 90 degrees, and consequently to enhance spray characteristics, for example, tip penetration (fuel-spray penetration), spray/wall impingement, air/fuel mixing, and formation of a controlled air/fuel mixture layer.

Figure 7:
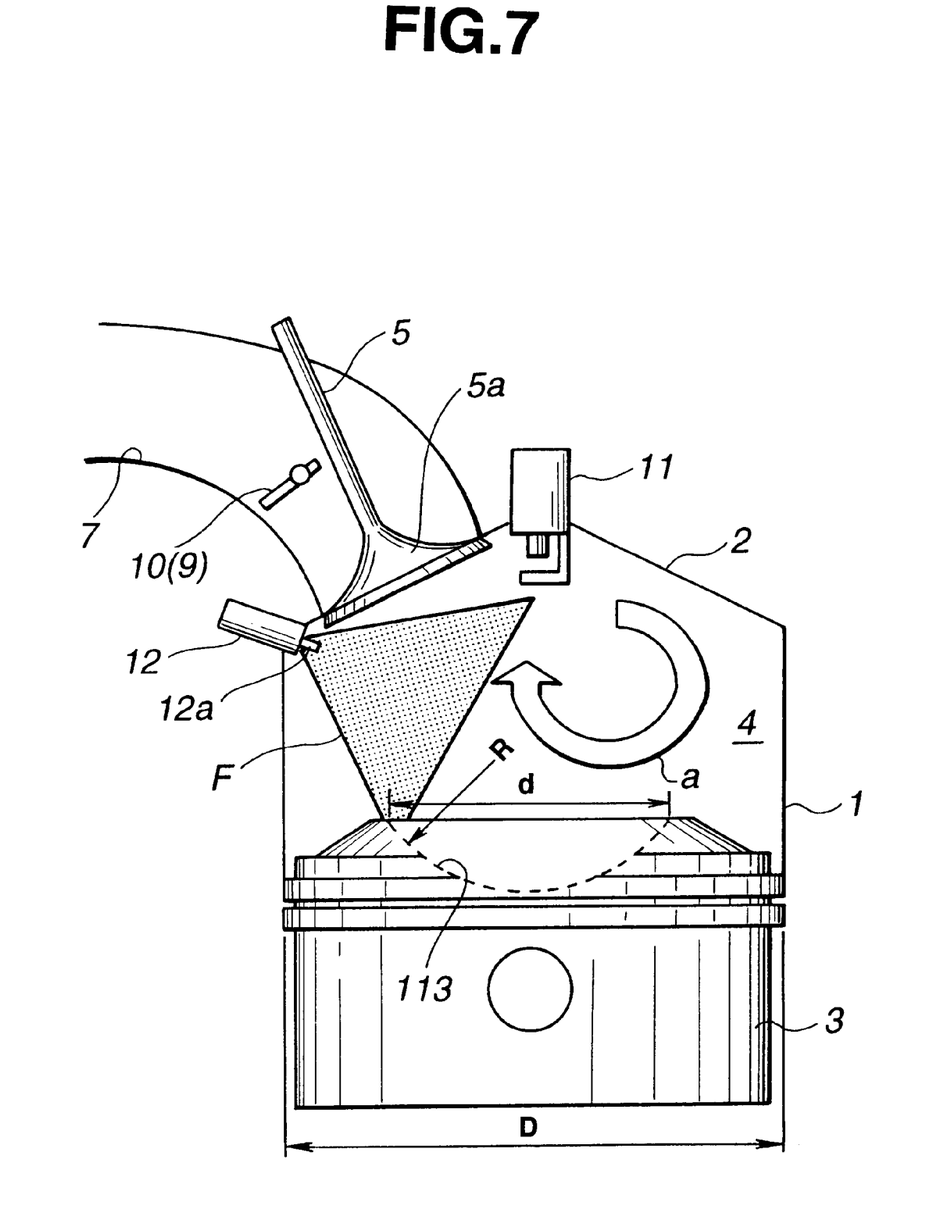
FIG. 7 is a longitudinal cross-sectional view illustrating a second embodiment of a cylinder direct-injection spark-ignition internal combustion engine having a piston formed with a woodruff keyway-like piston bowl cavity.

As will be appreciated from the above, in the engine of the first embodiment, the spherical bowl-like piston bowl cavity combustion chamber 13, centrally formed in the central portion of the piston crown, has the deepest recessed, inner peripheral wall portion at the center of the piston crown and also the spherically-recessed, inner peripheral wall surface of the cavity is contoured so that the spherically-recessed, inner peripheral wall surface is curved substantially along a stream line of the tumble flow (see the arrow a of FIG. 1) of induced air. This suppresses or avoids an undesirable disturbance in the tumble flow from occurring. As a result of this, the tumble-flow sustaining performance can be enhanced. Thus, the fuel spray (denoted by F in FIGS. 1 and 2), injected from the injector 12 on the compression stroke during the stratified charge combustion mode, can be certainly and reliably carried on the tumble flow and delivered to the vicinity of the tip of the spark plug 11 to create a richer air/fuel mixture layer around the spark plug for easy ignition. Accordingly, a stratified combustion stability can be highly enhanced. As discussed above, the shape of location (arrangement) of the spherical bowl-like piston cavity 13 are effective to create strong tumble flow, suppressing undesired disturbance introduced in the tumble flow. Furthermore, the proper setting of the ratios d/D and R/D eliminates the necessity for an excessively and unreasonably deep piston bowl cavity. Therefore, it is possible to design the piston bowl cavity combustion chamber 13 as small as possible. As a consequence, the entire surface area of the combustion chamber 4 can be reduced, thereby effectively decreasing a thermal loss, and whereby the engine power output can be enhanced during the homogeneous combustion mode as well as during the stratified combustion mode. By virtue of the high tumble-flow sustaining performance, attained or obtained by the unique shape and location of the spherical bowl-like piston cavity combustion chamber 13, the fuel, injected by the injector nozzle 12a and dispersed throughout the combustion chamber 4, can be efficiently flung upward by the full cooperation of the controlled strong tumble flow (see the arrow a of FIG. 1) and the reasonably curved recessed inner peripheral wall surface of the cavity 13, and simultaneously the strong tumble flow contributes to a positive separation of the fuel film adhered to the inner wall of the cavity 13. This avoids undesired carbonization from occurring owing o the fuel film, and also enhances an overall combustion stability (including a homogeneous combustion stability as well as a stratified combustion stability), with remarkable reduction of exhaust emissions such as smoke, particulate matter (PM), unburnt hydrocarbons (HCs), and suppression of formation of deposits. Moreover, the spherical bowl-like cavity 13 is formed essentially in the central portion of the piston crown, and thus a balance of the piston 3 moving up and down is good. The good dynamic piston balance, arising from the centrally-formed spherical bowl-like cavity 13, eliminates or reduces noises and unsymmetrical piston wear during operation of the engine, and thereby lengthens the engine durability. More particularly, in the first embodiment, the piston bowl cavity combustion chamber 13 is formed as a spherical recessed, cup-like portion, and thus a total sustaining performance for tumble flow components in every fluid-flow directions, contained in the induced air flow (or the intake-air flow incoming through the intake port), is enhanced. The enhanced total tumble-flow sustaining performance realizes a more stable combustion during the stratified charge combustion mode. Also provided in the intake port 7 is the tumble-flow strengthening mechanism 9 (for example, the partial shut-off valve 10 in the first and second embodiments). As explained above, the tumble-flow strengthening mechanism 9 serves to positively create a strong tumble flow and to introduce a strong tumbling action to the air/fuel mixture. The provision of the tumble-flow strengthening mechanism 9 increases a stratified charge combustion operating mode range. As shown in FIGS. 1 and 7, the partial shut-off valve 10 is used as the tumble-flow strengthening mechanism 9, so that the partial shut-off valve 10 closes to shut off the lower-half fluid passage area of the intake port 7 during the stratified combustion, and fully opens to establish full fluid communication of the intake port 7 during the homogeneous combustion. The partial shut-off valve 10 is simple in construction and is easily installed on the intake port 7, thus providing a low-cost tumble-flow strengthening mechanism.

Figure 4:
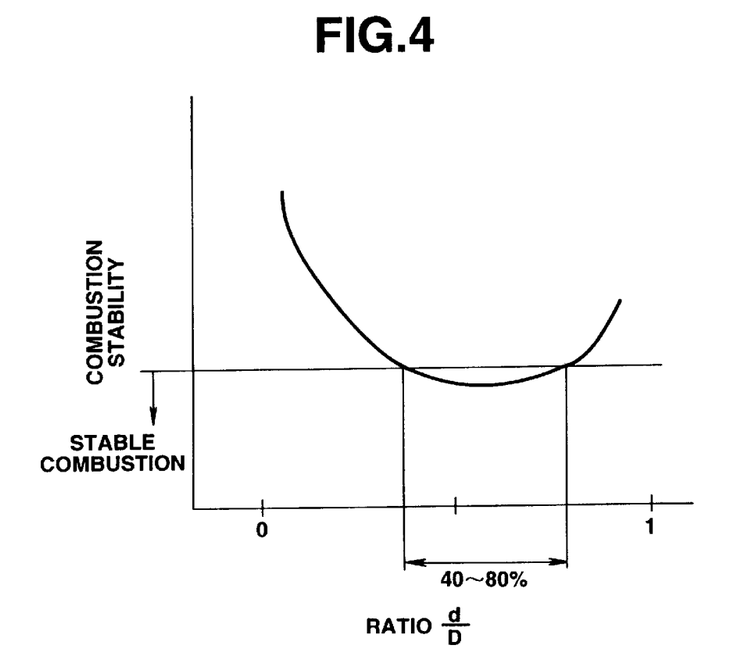
FIG. 4 is a graph illustrating the relationship between a combustion stability and a ratio (d/D) of an inside diameter (d) of the circular opening of the piston bowl cavity to a cylinder bore (D).
Figure 5:
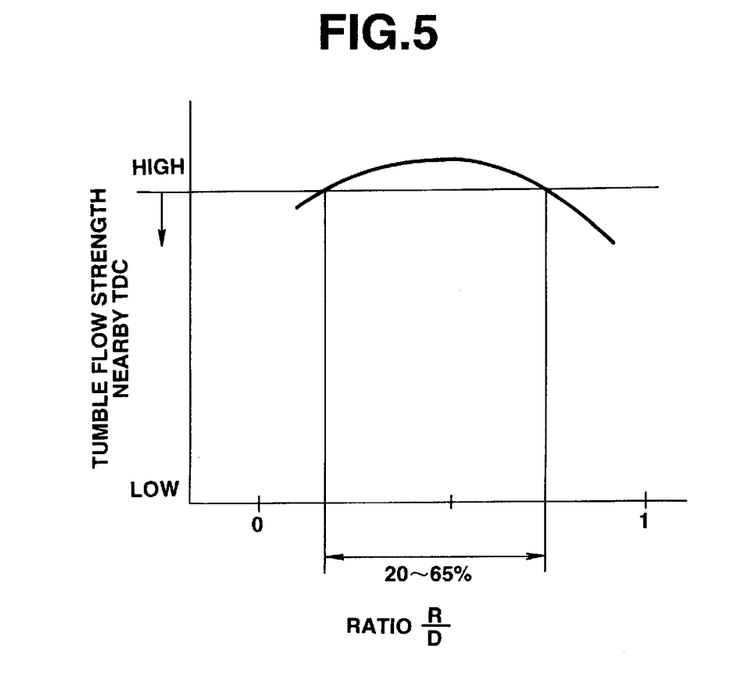
FIG. 5 is a graph illustrating the relationship between a tumble flow strength nearby top dead center (i.e., a tumble-flow sustaining performance) and a ratio (R/D) of the radius of curvature (R) of the curved, recessed portion of the piston bowl cavity to the cylinder bore (D).

Referring now to FIGS. 4 and 5, there are shown variations in a stratified combustion stability affected by the magnitude of an area of the circular opening of the spherically-recessed bowl-like cavity combustion chamber 13 and the depth of the cavity 13. The test data shown in FIGS. 4 and 5 are experimentally assured by the inventors of the invention. As seen in FIG. 4, when the ratio d/D of the circular cavity opening diameter (d) to the cylinder bore (D) is set at 60%, the engine exhibits the highest stratified combustion stability. With the ratio (d/D) set near at 30%, the opening area of the spherical bowl-like piston bowl cavity 13 is excessively narrow, and the excessively narrow cavity opening has the difficulty in receiving or capturing the fuel spray injected. This allows the fuel spray to undesiredly spread or diffuse within the combustion chamber 4, thus resulting in unstable combustion. On the contrary, when the opening area of the spherical bowl-like piston bowl cavity is excessively large, for example, with the cavity opening area set nearby 90%, the fuel spray injected tends to easily spread within the cavity combustion chamber 13, because of the excessively larger cavity opening. In addition to the above, as seen from the characteristic curve shown in FIG. 5, the tumble flow strength (or the tumble-flow sustaining performance) changes depending on the ratio (R/D) of the radius-of-curvature R of the curved, recessed portion of the spherical bowl-like piston bowl cavity 13 to the cylinder bore D. As seen in FIG. 5, when the ratio R/D is set at approximately 40%, the highest tumble-flow sustaining performance is obtained. The tumble-flow sustaining performance is maintained at a comparatively high level, when the ratio R/D is within a range of 20% to 65%. Conversely, when the ratio R/D is less than 20%, or when the ratio R/D is above 70%, there is a tendency for the tumble-flow sustaining performance to decrease. On the basis of the test results shown in FIGS. 4 and 5, the diameter d of the spherical bowl-like piston bowl cavity circular opening is set to satisfy the ratio d/D, ranging from 40% to 80%, whereas the radius-of-curvature R of the spherical bowl-like piston bowl cavity 13 is set to satisfy the ratio R/D, ranging from 20% to 65%, and whereby the engine power output can be improved owing to both the enhanced stratified combustion stability, and the enhanced tumble-flow sustaining performance.

Figure 6:
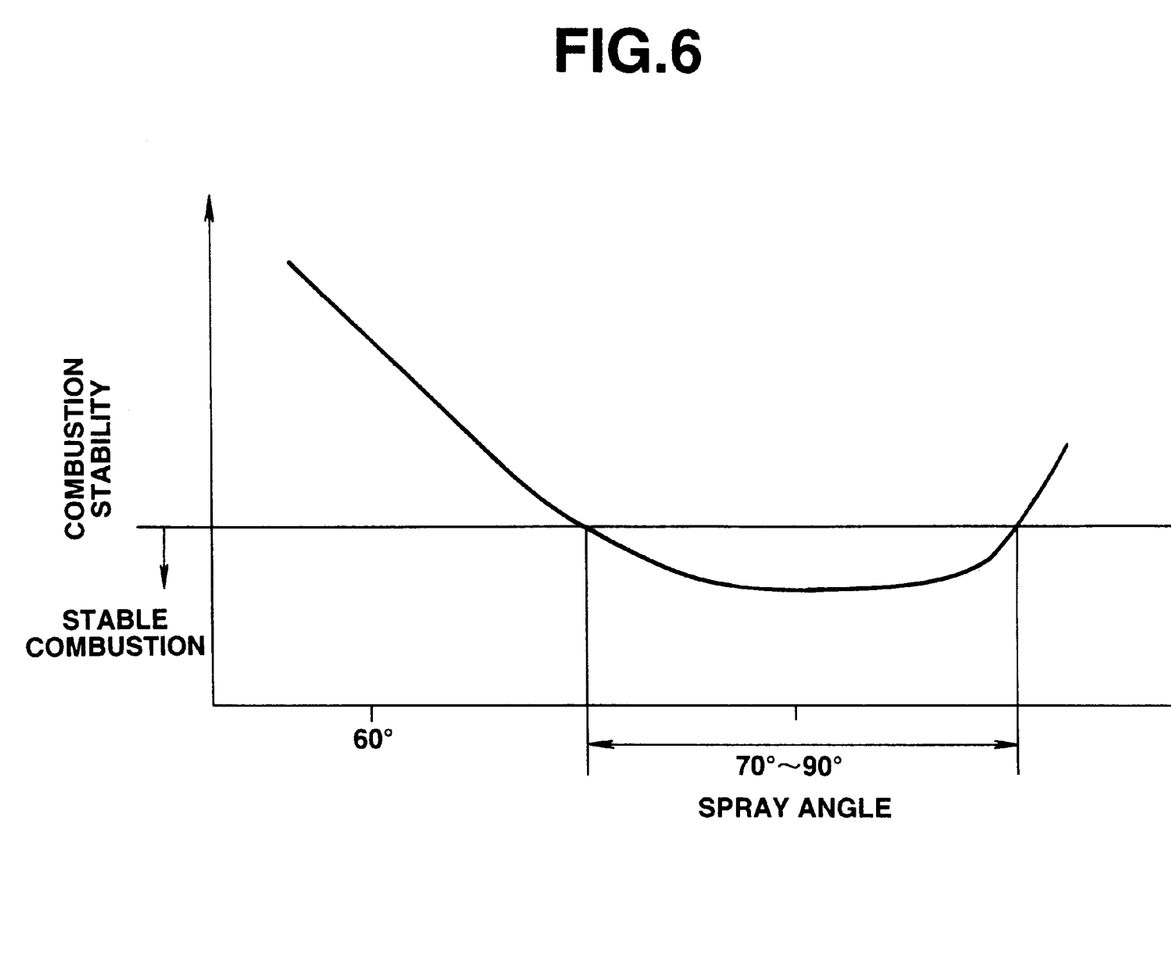
FIG. 6 is a graph illustrating the relationship between a combustion stability and a spray angle of a cone-shaped fuel-spray injected.

Referring now to FIG. 6, there is shown the spray angle versus combustion stability characteristic curve. As seen in FIG. 6, when the fuel-spray angle is below 70 degrees, there is a tendency for the air-fuel mixture fling-up effect caused by the strong tumble flow to drop during the stratified charge combustion mode. Also, such a relatively narrow spray angle (below 70°) results in the degraded air/fuel mixture homogenization due to increased spray penetration during the homogeneous combustion mode (during the early fuel-injection mode in the intake stroke), and also results in adhesion of the fuel film to the piston crown. With the spray angle below 70 degrees, the combustion stability tends to be lowered in the homogeneous combustion mode as well as the stratified combustion mode. Conversely, when he spray angle is set to be greater than 90 degrees, there is a tendency for the fuel spray to excessively disperse within the combustion chamber, owing to the excessively wide spray angle(above 90°). Such widely dispersed-fuel spray results in undesired adhesion of the fuel film onto the spark plug, thus causing sooty carbon deposits on the insulator around the electrode of the spark plug 11. This deteriorates the stratified combustion stability. In order to obtain a more stable combustion characteristics (containing both a stratified combustion stability and a homogeneous combustion stability), the spray angle is set within a predetermined angle range of 70° to 90°. To provide the predetermined spray angle ranging from 70° to 90°, the direct-injection spark-ignition engine of the embodiment uses a wide-angle injector nozzle. Therefore, the stratified combustion stability can be more highly enhanced. Additionally, the use of the wide-angle injector nozzle, capable of the spray angle range of 70° to 90°, is effective to promote the mixture homogenization during the homogeneous combustion mode, and thus suppresses formation of smoke, unburned HC, sooty carbon deposits.

Second Embodiment

Figure 8:
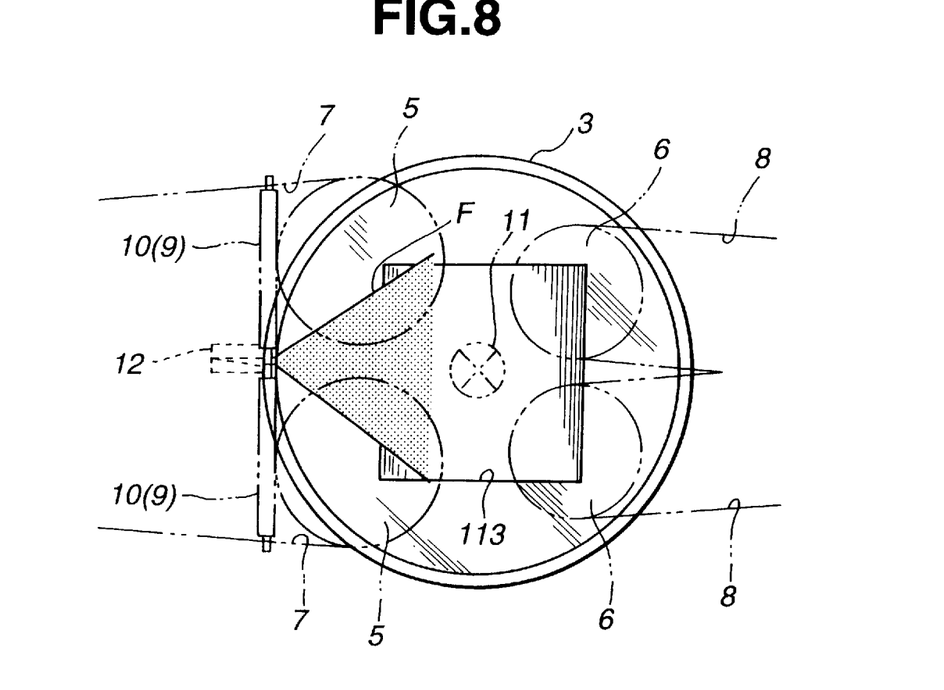
FIG. 8 is a top view of a piston of the engine of the second embodiment, having the improved woodruff keyway-like bowl-in-piston combustion chamber structure.
Figure 9:
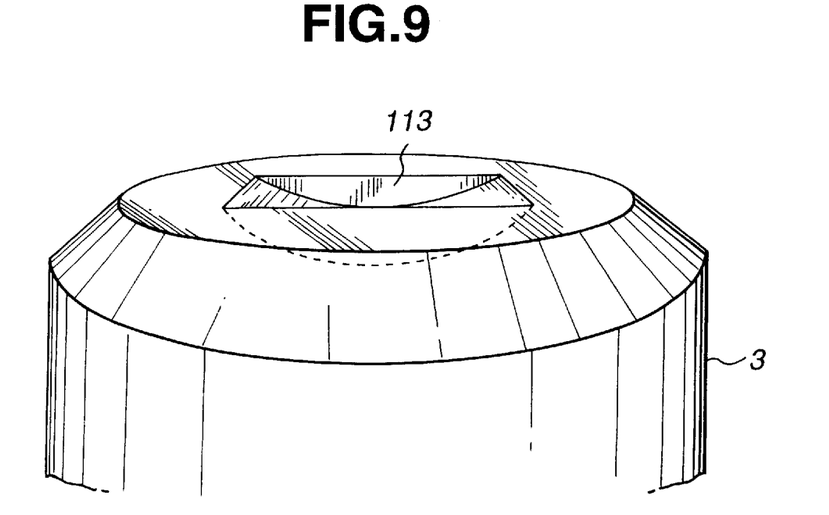
FIG. 9 is a perspective view illustrating the piston head portion of the engine of the second embodiment.

Referring now to FIGS. 7 through 9, there is shown the engine structure of the second embodiment. The engine structure of the second embodiment of FIGS. 7–9 is similar to that of the first embodiment of FIGS. 1–3, except that the shape of the piston bowl cavity of the second embodiment is different from that of the first embodiment. As best seen in FIG. 9, the second embodiment is slightly different from the first embodiment, only in that the piston employed in the engine of the second embodiment is formed with a woodruff keyway-like piston bowl cavity 113. Thus, the same reference signs used to designate elements in the engine of the first embodiment shown in FIGS. 1–3 will be applied to the corresponding elements used in the engine of the second embodiment shown in FIGS. 7–9, for the purpose of comparison of the first and second embodiments. Only the piston structure having the woodruff keyway-like piston bowl cavity 113 will be hereinafter described in detail with reference to the accompanying drawings, while detailed description of the other elements will be omitted because the above description thereon seems to be self-explanatory. As can be appreciated from FIGS. 7–9, the woodruff keyway-like piston bowl cavity 113 is defined by two opposing parallel flat side wall portions and a rounded bottom wall portion. The previously-noted two opposing parallel, substantially crescentic flat side walls of the cavity 113 formed in such a manner as to extend along the tumble flow indicated by the arrow a shown in FIG. 7 and to be substantially parallel to the direction of the tumble flow indicated by the arrow a. The previously-noted rounded bottom wall portion of the cavity 113 is rounded in the direction of the tumble flow indicated by the arrow a. The radius of curvature R of the woodruff keyway-like piston bowl cavity 113 means a radius of curvature of a curved line obtained when the woodruff keyway-like piston bowl cavity 113 is cut by a plane parallel to the previously-noted two opposing flat side walls. As seen in FIGS. 7–9, the rounded bottom wall portion of the cavity 113 has the same radius of curvature in the direction normal to the two opposing parallel, substantially crescentic side walls of the cavity 113. A square opening (an essentially regular square opening) of the woodruff keyway-like piston bowl cavity 113 is defined by the two parallel, obtuse-angled, edged portions of the rounded bottom wall portion and the two parallel, right-angled edged portions of the two opposing flat side walls. In the same manner as the cavity 13 of the first embodiment, in order to provide the stable stratified combustion stability, the length d of each of four sides of the square opening of the woodruff keyway-like piston bowl cavity 113 is dimensioned so that the ratio (d/D) of the length d to the cylinder bore D is within 40% to 80%. Also, in order to enhance the tumble-flow sustaining performance, the radius-of-curvature R of the rounded bottom wall portion of the cavity 113 is dimensioned so that the ratio (R/D) of the radius-of-curvature R of the rounded bottom wall portion to the cylinder bore D is within 20% to 65%. Thus, the engine of the second embodiment can provide the same effects as that of the first embodiment. Furthermore, the rounded bottom wall portion of the cavity 113 is effectively recessed along the direction (or the stream line) of the tumble flow (see the arrow a shown in FIG. 7), and additionally the two opposing flat side walls of the cavity 113 are arranged substantially parallel to the stream line of the tumble flow. Thus, the two opposing flat side walls and the smoothly curved, rounded bottom wall portion of the cavity 113 ensures a good convergence action and an enhanced flow-straightening action or effect on the tumble flow. As a result, the tumble-flow sustaining performance can be more greatly enhanced. Accordingly, the stratified combustion stability can be further enhanced.

Figure 10:
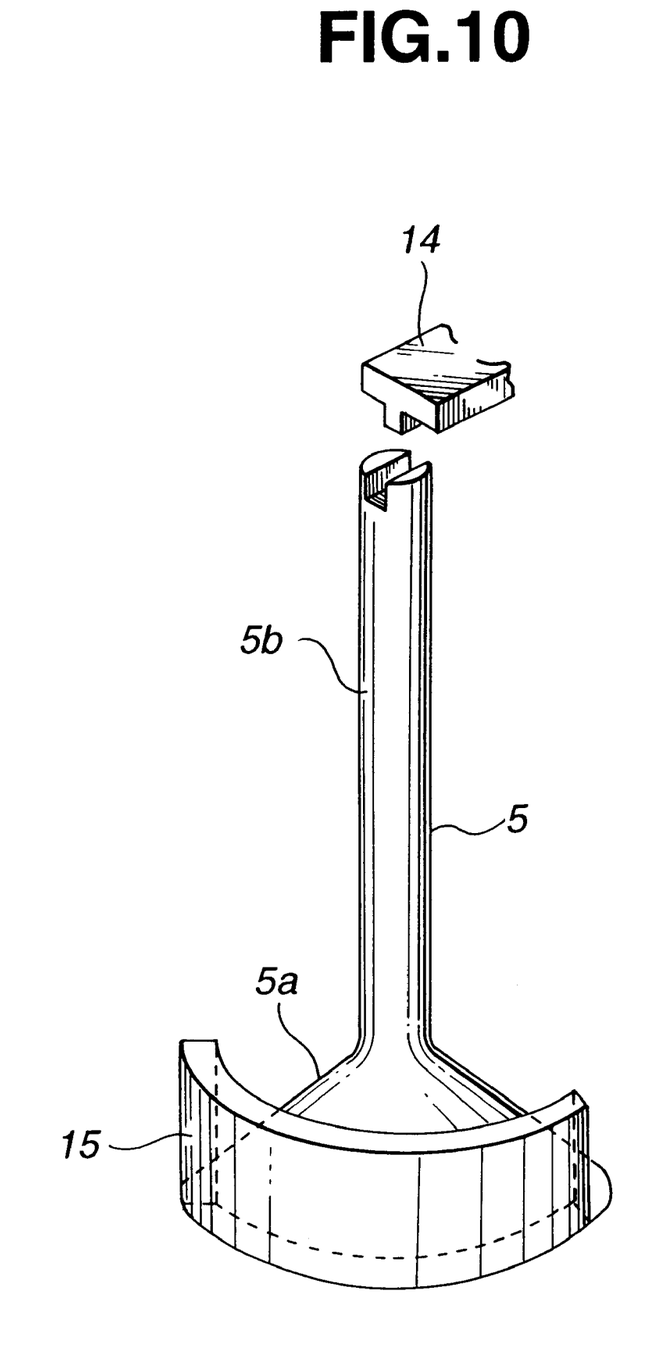
FIG. 10 is a perspective view illustrating a modification of a tumble-flow strengthening device or mechanism.

Referring to FIG. 10, there is shown the modification of the tumble-flow strengthening mechanism 9. In the first and second embodiments previously described, as an example of the tumble-flow strengthening mechanism, the partial shut-off valve 10 is used. On the contrary, in the modification shown in FIG. 10, a tumble-flow strengthening means is attached to the intake valve 5 itself. As shown in FIG. 10, the intake valve 5 is comprised of a valve head portion 5a and a valve stem portion 5b. The free end of the valve stem 5b is formed with a slotted portion coupled to a ridged portion of a rocker arm 14, for prevention of rotational motion of the valve stem 5b. A tumbling-action generating curved, partially collared, upright wall portion 15 is attached onto the back of the valve head portion 5a in a manner as to circumferentially extend over the lower half of the valve head portion 5a. Therefore, the tumble flow can be strengthened by checking the induced air-flow flowing through the opening space of the lower-half side of the intake valve 5. In such a case, the tumble-flow strengthening means or mechanism can be attained by only the structural change in the valve head portion of the intake valve 5. In order to provide a tumble-flow strengthening means or mechanism with low production costs, it is advantageous to integrally form or integrally connect the tumbling-action generating collared wall portion 15 with the intake valve 5. As set forth above, in the case that the tumble-flow strengthening means or mechanism 9 is provided, a stratified combustion operating mode range can be easily widened. In the shown embodiments, the fundamental concept (the key feature) of the invention is exemplified as the unique piston bowl cavity structure creating the ordinal tumble flow (the vertical vortex airflow motion occurring in the ordinal direction indicated by the arrow a in FIGS. 1 and 7). As may be appreciated, the concept of the invention can be applied to a piston bowl cavity structure creating a so-called reverse tumble flow (vertical vortex airflow motion occurring in the opposite tumbling direction with respect to the direction indicated by the arrow a).

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A direct-injection spark-ignition engine operable in at least a stratified charge combustion mode where fuel injection is executed on a compression stroke while introducing a vertical-vortex tumble flow to an induced air drawn into a combustion chamber through an intake port, comprising:

a cylinder block having a cylinder;

a piston movable through a stroke in the cylinder, and having a piston bowl cavity combustion chamber in a piston head;

a cylinder head mounted on said cylinder block;

a spark plug centrally located at a center of the combustion chamber; and a fuel injector valve provided at a side wall portion of the combustion chamber and near an intake valve disposed in the intake port, for injecting fuel directly into the combustion chamber;

said piston bowl cavity combustion chamber being formed in the piston head, so that a deepest portion of said piston bowl cavity combustion chamber is obtained at a center of the piston head, and an inner peripheral concave wall surface of said piston bowl cavity combustion chamber is contoured to be curved in a direction of a streamline of the vertical-vortex tumble flow.

2. The direct-injection spark-ignition engine as claimed in claim 1, wherein said piston bowl cavity combustion chamber comprises a spherical bowl cavity having a circular opening and having the deepest portion at a cavity center thereof.

3. The direct-injection spark-ignition engine as claimed in claim 2, wherein the spherical bowl cavity is coaxially arranged with respect to a central axis of said piston (3).

4. The direct-injection spark-ignition engine as claimed in claim 2, wherein a ratio (d/D) of an inside diameter (d) of the circular opening of the spherical bowl cavity to a cylinder bore (D) of the cylinder is set within a range of 40% to 80%, and a ratio (R/D) of a radius-of-curvature (R) of the inner peripheral concave wall surface of the spherical bowl cavity to the cylinder bore (D) is set within a range of 20% to 65%.

5. The direct-injection spark-ignition engine as claimed in claim 1, wherein said piston bowl cavity combustion chamber comprises a woodruff keyway cavity having a square opening and having the deepest portion at a cavity center thereof, said woodruff keyway cavity being defined by two opposing parallel, substantially crescentic flat side wall portions and a rounded bottom wall portion.

6. The direct-injection spark-ignition engine as claimed in claim 5, wherein the woodruff keyway cavity is coaxially arranged with respect to a central axis of said piston.

7. The direct-injection spark-ignition engine as claimed in claim 5, wherein a ratio (d/D) of a length (d) of each of four sides of the square opening of the woodruff keyway cavity to a cylinder bore of the cylinder is set within a range of 40% to 80%, and a ratio (R/D) of a radius-of-curvature (R) of the rounded bottom wall portion of the woodruff keyway cavity to the cylinder bore (D) is set within a range of 20% to 65%.

8. The direct-injection spark-ignition engine as claimed in claim 1, which further comprises a tumble-flow strengthening mechanism provided in an induction system.

9. The direct-injection spark-ignition engine as claimed in claim 8, wherein said tumble-flow strengthening mechanism comprises a partial shut-off valve movable to a closed position to shut off a lower half of the intake port during the stratified charge combustion mode, and to an open position to ensure full fluid communication therethrough during a homogeneous combustion mode where fuel-injection early in an intake stroke produces a homogeneous air-fuel mixture.

10. The direct-injection spark-ignition engine as claimed in claim 8, wherein said tumble-flow strengthening mechanism comprises a collared wall portion being attached to the back of a valve head portion of the intake valve so that the collared wall portion circumferentially extends over a lower half of the valve head portion.

11. The direct-injection spark-ignition engine as claimed in claim 1, wherein said fuel injector valve has a wide-angle injector nozzle of a fuel-spray angle, ranging from 70° to 90°.

* * * * *